United States Patent [19]

Arai et al.

[11] 3,879,979
[45] Apr. 29, 1975

[54] FRAME MANUFACTURING APPARATUS
[75] Inventors: Osamu Arai; Kaoru Kikuchi; Tomoyuki Ogawa, all of Hitachi, Japan
[73] Assignee: Hitachi, Ltd., Tokyo, Japan
[22] Filed: July 25, 1973
[21] Appl. No.: 382,337

[30] Foreign Application Priority Data
Aug. 7, 1972 Japan................ 47-78359

[52] U.S. Cl. ............ 72/338; 72/7; 72/306; 72/405; 83/71
[51] Int. Cl. ............................ B21d 28/00
[58] Field of Search ............ 72/6, 7, 28, 306, 405, 72/338; 83/71, 72; 29/200 B, 200 R

[56] References Cited
UNITED STATES PATENTS

| | | | |
|---|---|---|---|
| 3,498,167 | 3/1970 | Hill | 83/71 |
| 3,512,435 | 5/1970 | Bossmann et al. | 83/71 |
| 3,527,128 | 9/1970 | Thumim | 83/71 |
| 3,581,535 | 6/1971 | Hinks | 72/319 |
| 3,650,141 | 3/1972 | Pepe | 83/71 |
| 3,691,887 | 9/1972 | Roch | 83/71 |

*Primary Examiner*—C. W. Lanham
*Assistant Examiner*—James R. Duzan
*Attorney, Agent, or Firm*—Craig & Antonelli

[57] ABSTRACT

An apparatus for automatically manufacturing a frame from a single flat strip blank, which comprises first means for forwarding the strip blank an optional distance, second means for applying a predetermined press work to the strip blank forwarded by said first means, third means for controlling said first and second means in accordance with preset working commands, fourth means for deforming the strip blank supplied from said second means into a predetermined shape, fifth means for shaping corner-forming portions of the strip blank at prescribed locations of said strip blank, and sixth means for bending the strip blank at the corner-forming portions shaped by the fifth means, whereby a planar frame is made from the single strip blank.

7 Claims, 9 Drawing Figures

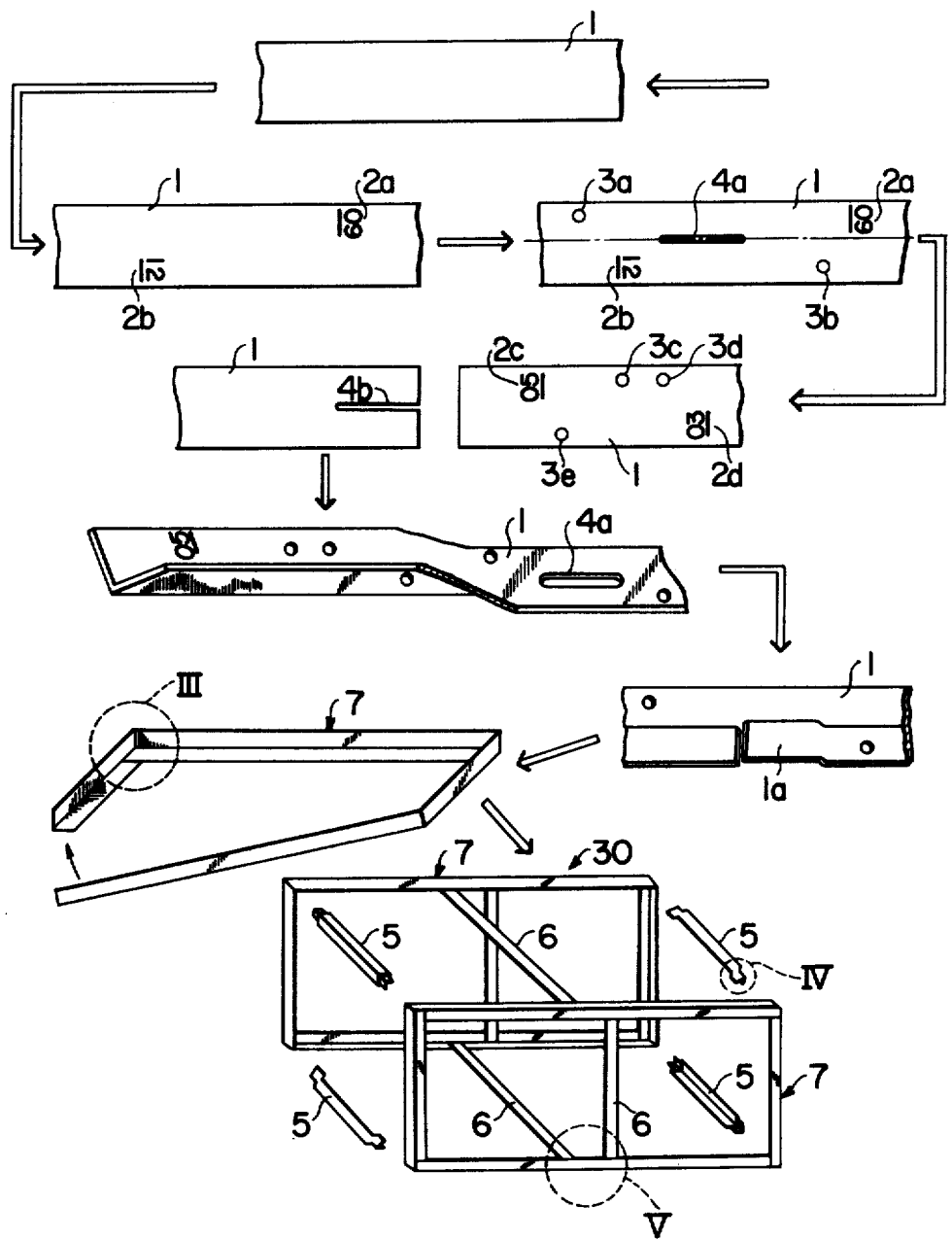

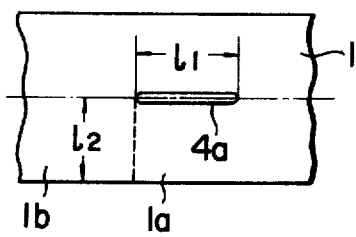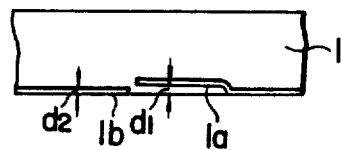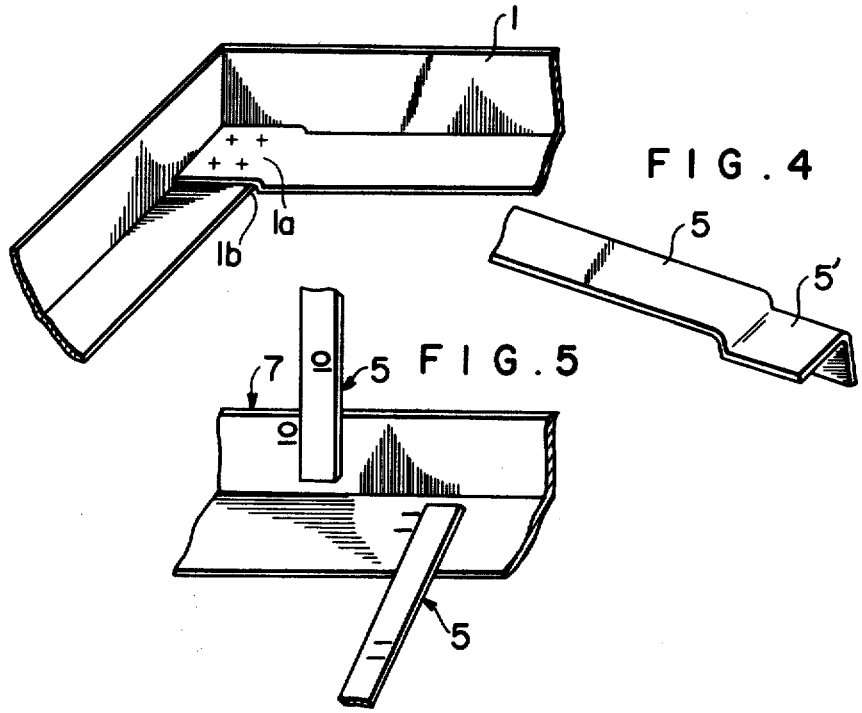

FRAME MANUFACTURING APPARATUS

This invention relates to an apparatus for automatically manufacturing a frame, for example, of a control board, switch board or the like.

In the past, this type of frame has been manufactured through the following steps:

Step 1: The step of shearing an L-shaped strip blank into the constituent members of the desired frame.

Step 2: The step of applying notching to the corner-forming portions of each member and providing marking on the member at locations where said member is to joined with other members.

Step 3: The step of punching holes of a predetermined diameter in each member of the markings.

Step 4: The step of assembling the members into a planar frame by connecting them as by arc welding.

Step 5: The step of correcting the dimensions, angles and distortions of the assembled planar frame and removing mill scales and spatters at the welds.

Step 6: The step of assembling a three-dimensional frame.

Step 7: The step same as the step 5.

The frame can be manufactured by the steps described above, but since the manufacturer is required to operate each step while confirming the dimensions of the frame on the production drawings and the frame is assembled from the individual members provided separately from each other, the assembling work has been quite timeconsuming and, therefore, the working efficiency has been low.

Futhermore, the conventional method has involved the problems of erroneous connection and erroneous selection of the members due to misreading of the drawings, and in addition, required much time and labor for the correction of distortions and bendings of the frame and for the removal of mill scales and spatters, because the frame undergoes the thermal influence of arc welding.

Recently, a method of automatizing, saving the labor and enhancing the efficiency of a work by use of a process control computer, is being employed in various industries, as seen in the control of machine tools, drafting machines, gas cutting machines, etc. utilizing a numerical control system.

Under such circumstances, it is the primary object of the present invention to provide a frame manufacturing apparatus in which is also used a process control computer to automatize the frame manufacturing operation and to enhance the working efficiency in the manufacture of a frame.

Another object of the invention is to provide an apparatus for automatically assembling a planar frame from a single flat strip blank, without shearing the strip blank into the constituent members of the frame.

According to one aspect of the invention, there is provided a frame manufacturing apparatus comprising first means for forwarding a flat strip blank an optional distance, second means for applying to said strip blank forwarded by the first means a press work to provide thereon index lines and index symbols and to form punched holes and cuts therein at prescribed locations, third means for controlling said first and second means in accordance with preset working commands, fourth means for deforming the strip blank cut in a predetermined length by the second means into a predetermined shape, fifth means for shaping corner-forming portions of the strip blank, and sixth means for bending the strip blank at the corner-forming portions to form a planar frame.

Other objects and features of the present invention will be understood from the following description taken in conjunction with the accompanying drawings.

FIG. 1 is a flow sheet illustrating the steps of manufacturing a frame according to the invention;

FIG. 2a is a detailed plan view of the cornerforming portion;

FIG. 2b is a detailed side view of the cornerforming portion;

FIG. 3 is an enlarged perspective view of the portion III of FIG. 1;

FIG. 4 is an enlarged perspective view of the portion IV of FIG. 1;

FIG. 5 is an enlarged perspective view of the portion V of FIG. 1;

Figure 6:
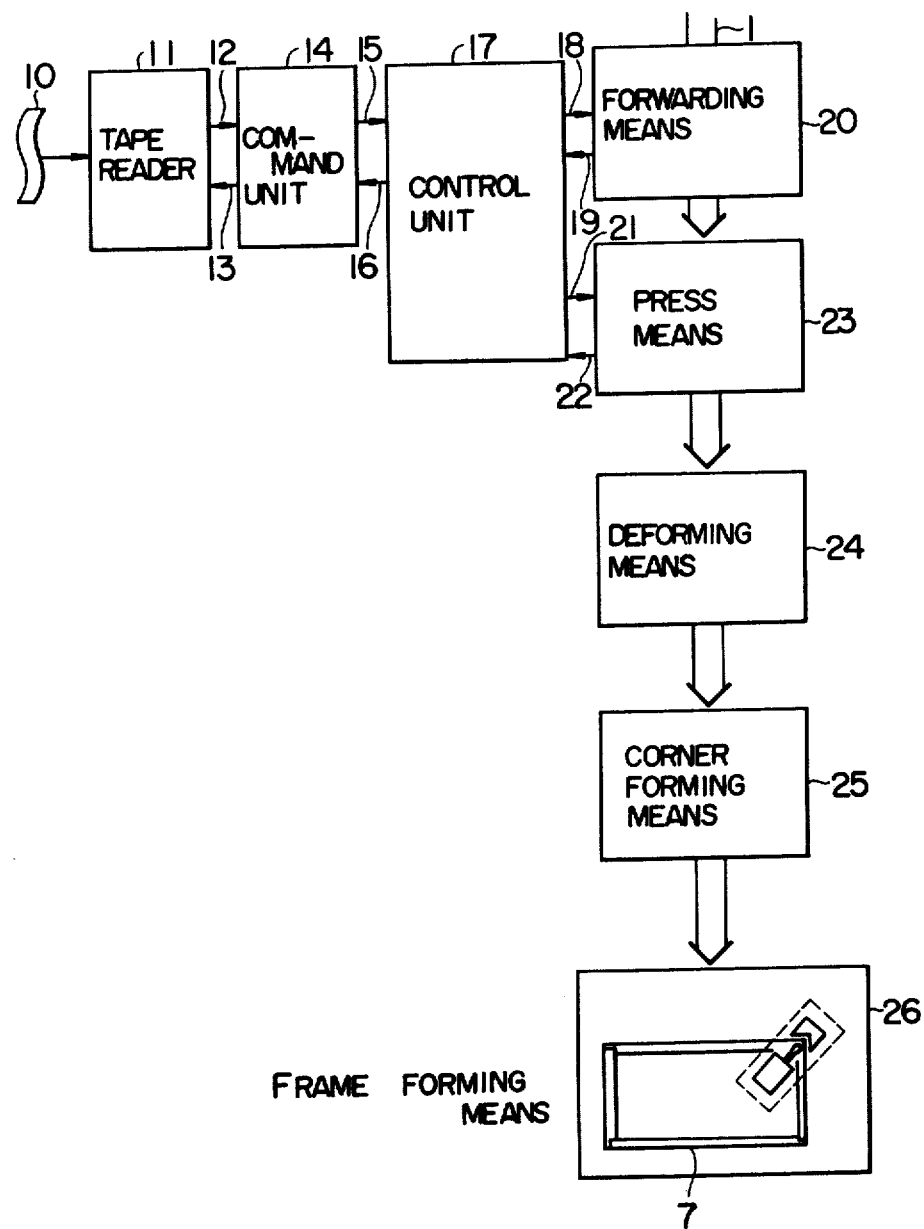
FIG. 6 is a block diagram showing an embodiment of the frame manufacturing apparatus of the invention.

With reference to the flow sheet of FIG. 1, a frame is manufactured by the apparatus of the invention through the following steps:

Step 1: The step of correcting distortions and bending memories of a flat strip blank 1 and forwarding said strip blank a predetermined distance.

Step 2: The step of punching index symbols and index lines on the strip blank 1 in the forwarded position as indicated at numerals 2a, 2b. Numerals 09 nd 12 indicate the index symbols and the lines denoted below the numerals indicate the index lines. In FIG. 1, the marking 2a is punched on the strip blank at first and then the marking 2b is punched after said strip blank 1 is further forwarded a predetermined distance from the position in which said marking 2a is punched.

Step 3: The step of punching holes in the strip blank 1. In this step, holes 3a, 3b are punched in the strip blank 1 at locations at which other member is to be connected to said strip blank, and the diameter of the holes is determined by the diameter of connecting bolts. Slot 4a is also formed in the strip blank 1 in the longitudinal direction for forming the corners of the frame. The alternate long and short dash line indicates a bending line along which the strip blank is to be bent into L-shape as will be described later.

Step 4: The step of severing the strip blank into a length necessary to form a planar frame. Reference numerals 4b designates a slot located at the cut end of the strip blank, which provides for the formation of a corner at the terminal end of the frame; 2c, 2d markings punched on the other strip blank; and 3c, 3e holes punched in said other strip blank at locations where said frame is to be connected with still another frame.

Step 5: The step of deforming the cut piece of strip into L-shape along the bending line indicated by the alternate long and short dash line in Step 3. The strip is not necessarily bent into the L-shape but may be bent in any other shape as required.

Step 6: The step of fabricating corner-forming portions of the frame. In this step, the strip section on one side of the slot 4a is sheared at right angles to the longitudinal direction of the strip and one of the lips 1a thus formed is raised upwardly. The lip 1a in which the cut is formed is the one which will face inwardly of the frame when the frame is formed.

Step 7: The step of forming a planar frame 7 and thereafter fixing the corner portions by spot welding.

Step 8: The step of assembling a three-dimensional frame 30 using the planar 7 made in the manner described above.

The frame is manufactured through the steps described above. Now, parts of the steps shown in FIG. 1 will be described in detail hereunder:

FIGS. 2a and 2b show the details of the corner-forming portion. In FIG. 2a, reference symbol $l_1$ designates the longitudinal length of the slot 4a formed in the strip blank 1, and $l_2$ designates the length of the strip section in a direction perpendicular to the longitudinal direction of the strip blank after the strip blank 1 is bent into L-shape, which strip section will face inwardly of the frame when the planar frame is formed. In this case, the length $l_1$ of the slot 4a is made somewhat longer than the length $l_2$. The dotted line indicates the cutting line along which the strip section is to be sheared in the step 6, and the alternate long and short dash line indicates the bending line along which the strip is bent into L-shape. The lip 1a defined by the cutting line and the slot 4a is raised upwardly from the sheet of FIG. 2a into the shape shown in FIG. 2b. The amount $d_1$ of upward displacement of the lip 1a is made slightly larger than the plate thickness $d_2$ of the strip blank 1. Therefore, when the frame is formed by bending the L-shaped strip blank 1, the lip 1a is superimposed on the adjacent portion 1b of the strip.

FIG. 3 shows in detail the portion III of FIG. 1. The lip 1a and the portion 1b which are put together one on another when the strip 1 is bent to form the frame, are connected with each other by spot welding at locations indicated by X markings.

FIG. 4 shows in detail the portion IV of FIG. 1, or the shape of a member 5 for linking the corresponding corners of two planar frames 7. Each end portion 5' of the member 5 which is to be connected with the corner of the frame is joggled inwardly by an amount substantially equal to the plate thickness of the frame.

FIG. 5 shows in detail the portion V of FIG. 1. Members 5 having index symbols punched thereon are connected with the strip at the locations of the matching index symbols punched on said strip in register with the index lines provided on said strip, respectively.

Of the other steps shown in FIG. 1, the steps 1 through 7 to form the planar 7 are operated automatically, and the frame manufacturing operation will be described hereunder with reference to the block diagram of FIG. 6 which shows briefly the apparatus for manufacturing the frame. In FIG. 6, reference numeral 10 designates a command tape having work information stored therein in the form of punch holes. The work information includes, in addition to the amount and speed of the forward movement of the strip blank 1, the types of index symbols and index lines and types of holes to be punched. Reference numeral 11 designates a tape reader which reads the information punched in the command tape and transmits the information to a command unit 14 through a line 12. The command unit 14 discriminates the information supplied from the tape reader 11, sets the working speed, calculates the amount of displacement and selects a press die (for index symbols, index lines and punched holes), and supplies the respective information to a control unit 17 through line 15. The control unit 17 compares the displacement command received from the command unit 14 through the line 15 with a signal which is supplied thereto from forwarding means 20 through a line 19 to indicate the present position of the strip blank 1, and transmits a deviation therebetween to the forwarding means 20 through a line 18 to drive said forwarding means. Further, the control unit 17 transmits a press die selection command, which is received from the command unit 14 through the line 15, to press means 23 through a line 21. The press means 23 in response to the command from the control unit perform a press work to provide the strip blank 1 with index symbols, index lines and holes. Upon completion of one cycle of press work, the press means 23 transmits through a line 22 to the control unit 17 a signal representative of completion of the press work. The control unit 17 transmits this signal through a line 16 to the command unit 14 which in turn transmits the signal through a line 13 to the tape reader 13. As a result, the tape reader 11 reads the next work information, and thereafter, the above-described operation is repeated. The forwarding means 20 is controlled by the control unit 17 as described above and forwards the strip blank 1 a predetermined distance by means of rotating rolls (not shown). Thus, the operation of step 1 shown in FIG. 1 is effected by forwarding means. The press means 23 includes two press sections, one of which performs the operation of punching the index symbols and index lines of step 2 and the other one of which performs the operations of punching holes and shearing the strip blank of steps 3 and 4. The press means 23 comprises the two separate press sections since different tools are utilized and different magnitudes of pressing force are applied in the two sections. However, if the press means can actuate the two sections together, the operations of steps 2 through 4 can be carried out successively. Namely, with reference to step 3 in FIG. 1, the press work is performed in the order of punching the marking 2a, punching the hole 3b, punching the slot 4a, punching the marking 2b, punching the hole 3a, ---, shearing the strip blank. Deforming means indicated at reference numeral 24 deforms the strip blank supplied from the press means 23 into an L-shape. Namely, step 5 shown in FIG. 1 is carried out by this deforming means 24. Corner forming means indicated at reference numeral 25 detects the corner-forming slot 4a, and performs the shearing and joggling operations for the formation of a corner of the frame. Namely, step 6 shown in FIG. 1 is carried out by this corner forming means 25. Frame forming means indicated at reference numeral 26 forms the frame 7 by bending the strip at the corner-forming portions fabricated by the corner forming means 25. The corners of the frame formed by the frame forming means 26 are welded by spot welding separately. Therefore, the formation of the frame 7 in step 7 shown in FIG. 1 is completed at the frame forming means 26, and the subsequent welding and assembling of a three-dimensional frame 30 are carried out separately from the series of operations for forming the frame 7. In the formation of the three-dimensional frame 30, the workers are not required to perform the works while reading the dimensions on the drawings from time to time. Since the index symbols and index lines are previously punched on the strip by the press means 23, the workers are only required to connect to the frame 7 the members 6 bearing the matching index symbols at the positons prescribed by the index lines. The corner linking member 5 and other members 6 which are used in assembling the three-dimensional frame 30 shown in step 8 of FIG. 1, are manufactured by separate apparatus.

According to the present invention, a frame is automatically manufactured from a single flat strip blank in the manner described above and, therefore, the working efficiency is improved remarkably as compared with the conventional method.

Further, according to the invention, the corner portions of the frame are formed by putting the adjoining sections of the strip one on another and bonding them together by spot welding, so that the frame is not subjected to the influence of the heat incident to welding as has been the conventional frames and hence the labor heretofore required for correcting the distortions and bendings of the frame and for removing mill scales and spatters can be saved.

For detecting the corner-forming slot 4a in the corner forming means 25, the slot 4a may be detected directly as by a guide pin or a guide hole previously formed in the strip blank for the formation of the slot 4a may be detected by the guide pin.

Now, the operation of the control unit 17 for controlling the forwarding means 20 and press means 23, shown in FIG. 6, will be described with reference to FIG. 7. For a better understanding, description will be made with reference to the case wherein the press works of steps 2 through 4 shown in FIG. 1 are carried out concurrently. The work information stored in the command tape 10 is transmitted to the control unit 17 through the tape reader 11 and command unit 14. Let it be supposed that the strip blank 1 moves in a direction from the arrow A towards the arrow B and is sheared by the press means 23 at the position of a reference line 0, and the operation of the press means for the preceding strip blank has been completed.

First of all, a command to move the strip blank 1 a distance $L_1$ from the reference line 0 is read by the tape reader 11 and transmitted to the control unit 17 through the command unit 14. The control unit 17 in trun transmits the command to the forwarding means 20 through the line 18 and the forwarding means 20 moves the strip blank 1 in response to the command. The amount of movement of the strip blank 1 is fed back to the control unit 17 through the line 19. When the strip blank 1 has moved an amount $L_1$ designated by the command, the control unit 17 transmits a signal to the forwarding means 20 through line 18 to stop said forwarding means, and therefore, the strip blank 1 stops. When the strip blank 1 stops, a signal representative of the completion of the forwarding operation is fed back from the control unit 17 to the command unit 14 through the line 16. In response to this signal, the command unit 14 transmits a command to the tape reader 11 to let it read the next work information from the command tape. The work information read by the tape reader is again supplied to the control unit 17 through the command unit 14. The work information in this case is a command instructing the press means to perform the operation of punching the marking 2e, i.e. the index symbol 15 and index line. Therefore, the control unit 17 transmits the command to the press means 23 through the line 21 and in response the press means 23 selects a press die corresponding to the marking 2e and actuates said press die to punch the marking on the strip blank 1 at a position corresponding to the distance $L_1$. The position of the marking 2e in the widthwise direction of the strip blank 1 is set concurrently with the selection of the press die. Upon completion of the punching operation by the press means 23, a signal representative of the completion of the punching operation is fed back from the press means 23 to the control unit 17 through the line 22 and further fed back to the command unit 14 from the control unit 17.

Then, a command for moving the strip blank 1 a distance $L_2$ from the reference line 0 is given to the control unit 17. In this case, since the strip blank 1 has already been moved the distance $L_1$ from the reference line 0 by the preceding command, the control unit 17 controls the forwarding means 20 to cause it to move the strip blank 1 only the balance of the two distances, i.e. ($L_2-L_1$). In practice, the control unit 17 has memory means for storing the amounts of movement of the strip blank 1, and the amount of movement of the strip blank in the preceding operation of the forwarding means is stored in said memory means. Therefore, the control unit 17, upon receiving the new command, indexes the amount of movement of the strip blank in excess of the previous amount of movement $L_1$ and stops the forwarding means 20 at the point when the total amount of movement stored in the memory means reaches a level matching with the distance $L_2$, whereby the strip blank 1 is stopped in a position just ($L_2-L_1$) advanced from the previous position. This type of point-to-point control is generally called "absolute system."

When the strip blank 1 has been moved the distance $L_2$ from the reference line 0, a command for punching a hole 3f is transmitted from the command unit 14 to the control unit 17. The control unit 17 in turn transmits the command to the press means 23 through the line 21. The press means 23, upon receiving the command, slects a press die corresponding to the diameter of the hole 3f, sets the press die in a widthwise position $W_2$ on the strip blank and actuates said press die to punch the hole. Upon completion of the hole punching operation, a signal representative of the completion of the operation is fed back form the press means 23 to the command unit 14 through the line 22 and from the control unit 17 to the command unit 14. Then, the next control unit 7 for moving the strip blank 1 a distance $L_3$ from the reference line 0 is given to the command unit 14 in the manner described above.

Thereafter, the same operation as described above is repeated, whereby a marking 2f is punched; a hole 3g is punched at the position of a distance $L_4$; and the corner-forming slot 4b is formed at the position of a distance $L_5$. The strip blank 1 is sheared by the press means 23 at the position of a distance $L_6$ which is the length of the strip piece necessary to form the planar frame. By this step, a series of operations of punching the necessary index symbols and index lines, forming the holes and shearing the strip blank is completed.

Although the present invention has been described hereinbefore as being an absolute system in which the operation is controlled in the fashion of point-to-point control, an incremental system may be employed. In the incremental system, the movement of the strip blank is controlled by incremental amounts. For instance, when the strip blank is to be positioned at the positions of distances $L_1, L_2, - L_6$ sequentially in the order mentioned, the movement from the position of distance $L_1$ to the positin of distance $L_2$ is controlled by the incremental amount $(L_2-L_1)$.

The widthwise distances $W_1, W_2, W_3$ of the strip blank 1 can be obtained simply by displacing the press die or said strip blank in the widthwise direction. However, since the strip blank 1 is supplied through a strip blank supply source, it is desirable not to displace the strip blank itself in the widthwise direction but to displace the press die used in the press means 23 in the widthwise direction of the strip blank as described above.

In the manufacture of this type of frame, the widthwise distance $W_1$ of the hole 3g and marking 2f, the widthwise distance $W_2$ of the hole 3f and marking 2e, and the widthwise distance $W_3$ of the corner-forming slot 4b are predetermined and uniform for every frame-forming strip. Therefore, by previously arranging the marking punching press die and the hole punching press die at the positions of $W_1$ and $W_2$ respectively and the corner-forming slot punching press die at the position of $W_3$ of the strip blank, the series of operations may be achieved simply by transmitting press die selection commands and no consideration needs to be given to the relative movement of the press dies and strip blank in the widthwise direction of the strip blank.

Figure 7:
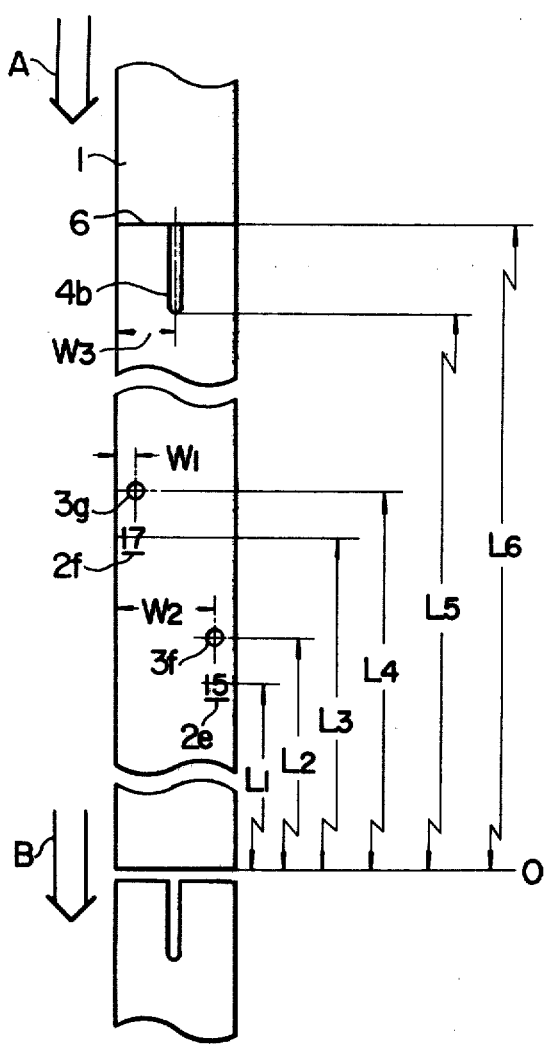
FIG. 7 is a diagram for explaining the operation of FIG. 6.

It will be understood that, while only one corner-forming slot 4b is shown in FIG. 7, which is formed at the terminal end of the strip piece, such corner-forming slots of course need to be formed at four locations of one strip piece to form one planar frame, and the distance between the outer ends of adjacent slots is the length of one side of the product frame.

Figure 8:
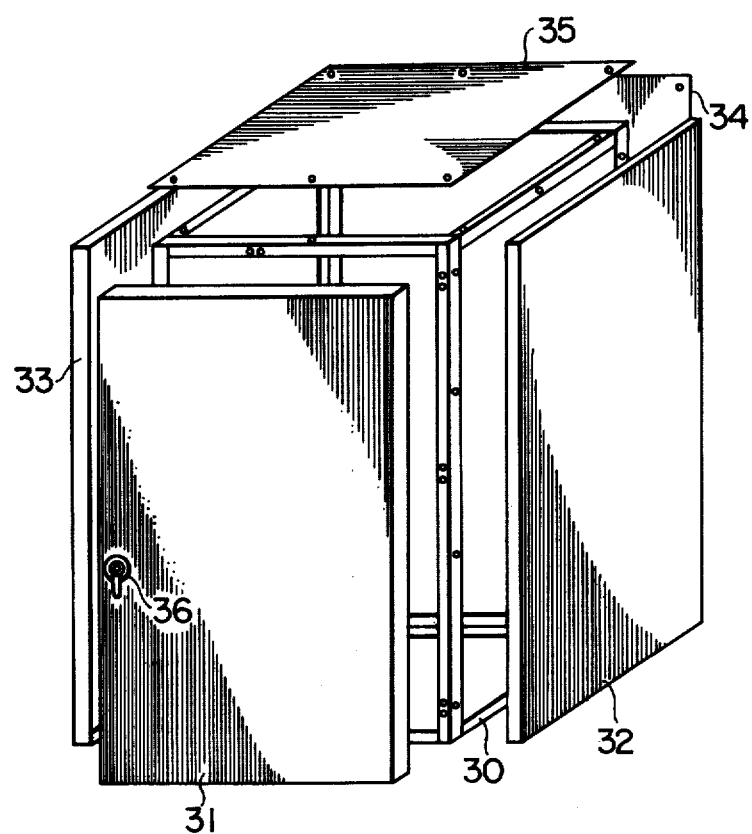
FIG. 8 is a perspective view showing a manner of assembling a box body using the frames manufactured by the present invention.

Referring to FIG. 8, there is exemplified the manner of marking the outer casing of a controlling board or the like by attaching panels to a three-dimensional frame which is made by assembling the planar frames manufactured by the frame manufacturing apparatus of the invention with other members. In FIG. 8, reference numeral 30 designates the three-dimensional frame, 31 a front door panel, 32 a right side panel, 33 a left side panel, 34 a back panel, 35 a ceiling panel, and 36 a handle provided on the front door panel 31. The panels are secured to the three-dimentional frame as by bolts screwed into the holes provided in the frame.

What is claimed is:

1. A method for manufacturing a planar frame comprising the steps of forwarding a flat strip blank an optional distance, said distance being predetermined to form a planar frame from a single length of said flat strip blank, applying a predetermined press work to a predetermined position of said strip blank forwarded by said first means by punching corner-forming slots at said position of said strip blank, said corner-forming slots being formed in the longitudinal directions of said strip blank, controlling said first and second means by applying preset working information.

deforming said strip blank supplied from said second means into a predetermined shape by bending said strip blank along the longitudinal direction of said strip blank, said corner-forming slots being aligned along the bend formed by said step of bending, and said corner-forming slots having a longitudinal dimension substantially equal to the width of the strip section from said bend, fabricating corner-forming portions at said corner-forming slots by shearing the strip section from said bend, said shearing step being performed in the widthwise direction of the strip blank at one end of each of said corner-forming slots, and by raising the resulting lip at said corner-forming slots and the sheared portion of said strip section to such a degree that said lip can be superimposed on the adjoining portion of said strip blank upon fabrication of said corner-forming portions, and bending said strip blank at said corner-forming portions and connecting said lip with said adjacent portions of said strip blank to form the planar frame.

2. A method according to claim 1, further including the step of forming a plurality of frame members, each of said frame members having end portions to be connected to said corner portions of said planar frames, said end portions being formed by jogging inwardly by an amount substantially equal to the thickness of said strip section of said planar frame, wherein a plurality of said planar frames are connected with said frame members to form a three-dimensional frame assembly.

3. A method according to claim 1, wherein said step of applying a predetermined press work to predetermined positions of the strip blank including punching index symbols and index lines on the strip blank, forming connecting holes, and shearing the strip blank into a length corresponding to the single length of said planar frame.

4. A frame manufacturing apparatus comprising first means for forwarding a flat strip blank an optional distance, second means for applying a predetermined press work to a predetermined position of said strip blank forwarded by said first means, said second means including means to punch corner-forming slots at said position of said strip blank, said corner-forming slots being formed in the longitudinal direction of said strip blank, third means for controlling said first and second means in accordance with a preset working information, fourth means for deforming said strip blank supplied from said second means into a predetermined shape, said predetermined shape including a bent-shape having a bend along the longitudinal direction of said strip, said corner-forming slots being aligned along said bend, and said corner-forming slots having a longitudinal dimension substantially equal to the width of the strip section from said bend, fifth means for fabricating corner-forming portions, and corner-forming portions being formed at said corner-forming slots by means for shearing the strip section from said bend which will face inwardly of the frame when said strip blank is formed into the planar frame, said strip section being sheared in the widthwise direction of the strip blank at one end each of said corner-forming slots, said fifth means including means for forming a resulting lip with said corner-forming slot and sheared portion of said strip section, said lip being raised to such a degree that it will be superimposed on the adjoining portion of the strip blank upon fabrication of said corner-forming portions, and sixth means for bending said strip blank at said corner-forming portions and for connecting said lip with said adjoining portion of said strip blank to form a planar frame.

5. A frame manufacturing apparatus according to claim 4, wherein said third means includes a numerical control system.

6. A frame manufacturing apparatus according to claim 4, further including a plurality of frame members, each having end portions to be connected to said corner portions of said planar frames, each of said end portions being jogged inwardly by an amount substantially equal to the thickness of said strip section of said planar frame, wherein a plurality of said planar frames made by said sixth means are connected together with said frame members to form a three-dimensional frame assembly.

7. A frame manufacturing apparatus according to claim 4, in which said second means includes press dies for punching index symbols and index lines on the strip blank, forming connecting holes and said corner-forming slots in the strip blank, and shearing the strip blank into a length necessary for forming the planar frame.

* * * * *